J. KOHLER.
Machines for Dressing Nuts and Bolts.
No. 135,131.  Patented Jan. 21, 1873.
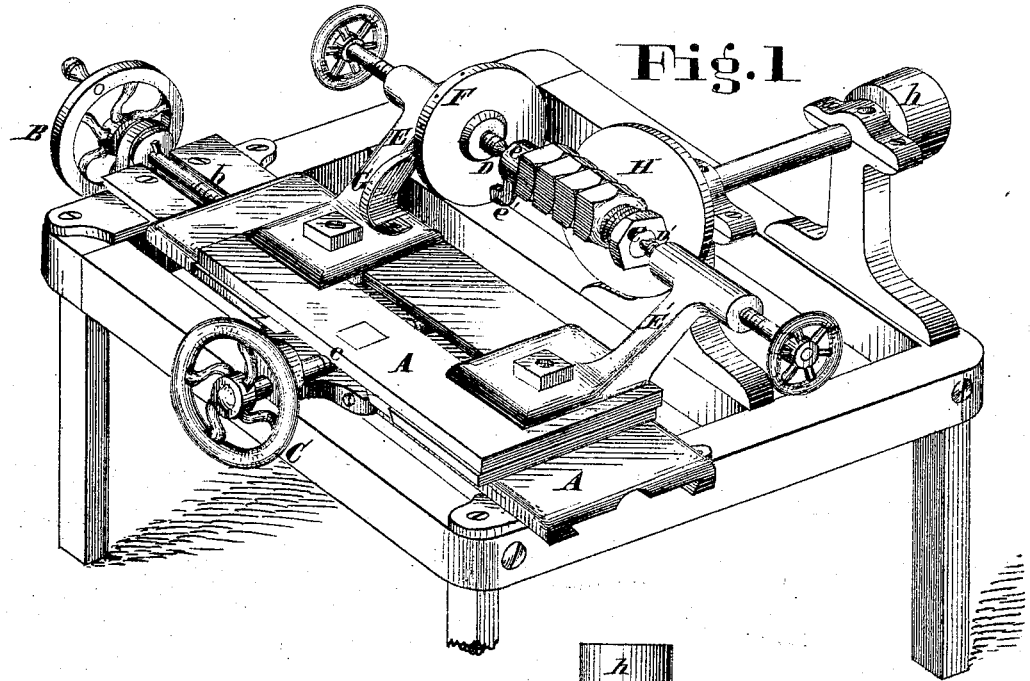
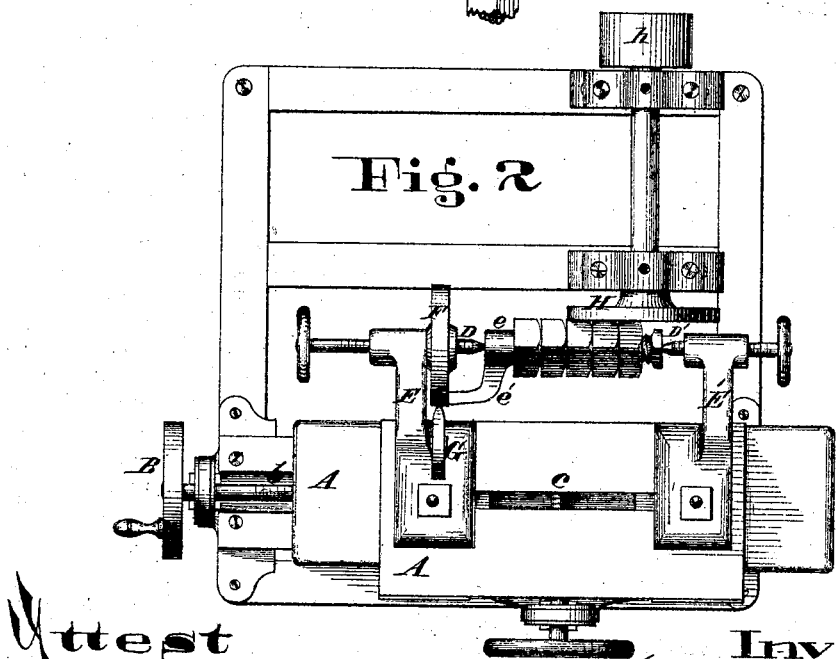
Attest  Inventor
  Joseph Kohler
  By F. Millward
  Attorney

UNITED STATES PATENT OFFICE.

JOSEPH KOHLER, OF CINCINNATI, OHIO.

IMPROVEMENT IN MACHINES FOR DRESSING NUTS AND BOLTS.

Specification forming part of Letters Patent No. 135,131, dated January 21, 1873.

*To all whom it may concern:*

Be it known that I, JOSEPH KOHLER, of Cincinnati, Hamilton county, Ohio, have invented a certain new and useful Improvement in a Machine for Shaping Nuts and Bolts, of which the following is a specification:

Nature and Objects of Invention.

My invention consists of a device for shaping nuts and bolt-heads by grinding them upon the flat surface or front face of a revolving emery-wheel driven by power, said wheel operating in combination with a compound rest consisting of two slides moving by means of suitable screws at right angles to each other—one longitudinal, to force the nuts across the face of the wheel, and the other transverse, to adjust the depth of the cut—the upper one bearing centers, between which the nut-mandrel is swung, one having an index-plate, with accompanying spring-catch, for revolving and setting the surfaces to be shaped. By this method of applying the metal to be shaped to the flat surface of the wheel the said wheel is not worn away unevenly, but continues to be a true and flat surface.

Description of Drawing.

Figure 1 is a perspective view of a machine embodying my invention. Fig. 2 is a plan of the same.

General Description.

A is a compound rest sliding upon ways moved and operated by the hand-wheels B and C and screws $b$ and $c$, working at right angles to each other in female screws or nuts. Two standards, E E', support the centers D D' for the mandrel or spindle $e$, upon which the nuts or bolt-heads to be shaped are secured. F is a graduated index-plate, having a spring-catch, G, for securing it in any point of adjustment, the point of the spring entering indentations in the plate so as to present each of the flat surfaces of the nuts or bolt-heads to be shaped successively to the surface of the emery-wheel H, across the flat-side surface or front face of which they are made to traverse by means of the action of the longitudinal screw $c$. The dog $e'$ serves to connect the plate F with the mandrel $e$.

The emery-wheel H, being driven by power applied to the pulley $h$, and the nuts or bolt-heads being made to traverse its flat-side surface or front face by the action of screw $b$, the flat sides of the polygonal heads are shaped squarely upon said front surface of wheel H instead of upon its periphery, and the amount of pressure against the same is regulated by the screw $c$. The whole face of said wheel H is worn evenly and smoothly, and does not become uneven or eccentric from the effects of attrition, as is the case where the periphery of the wheel operates as the grinding-surface, and the nuts or heads, being rotated upon the centers by means of the index-plate F and mandrel $e\ e'$, the depth of cut being adjusted by screw $c$ operating the transverse motion of the compound rest A, are ground evenly upon their several faces so as to produce true polygonal forms, in which each face is equidistant from the center of said nuts or heads.

Claims.

1. The combination of the compound rest A with the mandrel $e\ e'$, centers D D', and graduated index-plate F for passing the nuts or bolt-heads to be shaped across the flat-side surface or front face of the revolving emery-wheel H, substantially as specified.

2. The wheel H arranged to grind the nuts or bolt-heads by the attrition of its flat-side surface or front face, so as to remain true and flat, in combination with the compound rest A, its attached index F and spring-catch G, mandrel $e\ e'$, and centers D D', arranged and operating substantially as and for the purpose specified.

In testimony of which invention I hereunto set my hand.

JOSEPH KOHLER.

Witnesses:
  H. G. WEBBER,
  HENRY MILLWARD.